United States Patent
Suzuki et al.

(10) Patent No.: US 7,704,613 B2
(45) Date of Patent: Apr. 27, 2010

(54) MAGNETIC RECORDING MEDIUM FOR HIGH DENSITY RECORDING

(75) Inventors: Hiroyuki Suzuki, Kanagawa (JP); Hidekazu Kashiwase, Kanagawa (JP); Akira Morinaga, Kanagawa (JP); Tatsuya Hinoue, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 898 days.

(21) Appl. No.: 11/415,604

(22) Filed: May 1, 2006

(65) Prior Publication Data

US 2006/0292401 A1 Dec. 28, 2006

(30) Foreign Application Priority Data

Jun. 24, 2005 (JP) ............................. 2005-184375

(51) Int. Cl.
G11B 5/66 (2006.01)
(52) U.S. Cl. ...................... 428/828.1; 428/829; 428/830
(58) Field of Classification Search ............... 428/828.1
See application file for complete search history.

(56) References Cited

U.S. PATENT DOCUMENTS

| | | | | |
|---|---|---|---|---|
| 5,763,071 A * | 6/1998 | Chen et al. | .................. | 428/332 |
| 6,567,236 B1 * | 5/2003 | Doerner et al. | ............ | 360/97.01 |
| 6,737,172 B1 * | 5/2004 | Girt | ......................... | 428/828.1 |
| 6,794,057 B2 * | 9/2004 | Wang et al. | .............. | 428/828.1 |
| 6,811,890 B1 * | 11/2004 | Zhou et al. | ............... | 428/828.1 |
| 6,852,426 B1 * | 2/2005 | Girt et al. | .................... | 428/611 |
| 6,881,496 B2 | 4/2005 | Okamoto | | |
| 6,964,819 B1 * | 11/2005 | Girt et al. | ................... | 428/828 |
| 7,070,870 B2 * | 7/2006 | Bertero et al. | .............. | 428/828 |
| 7,125,616 B2 * | 10/2006 | Do et al. | .................. | 428/828.1 |
| 7,479,332 B2 * | 1/2009 | Fullerton et al. | ......... | 428/828.1 |
| 2002/0098390 A1 * | 7/2002 | Do et al. | ................. | 428/694 TS |
| 2005/0053805 A1 | 3/2005 | Hinoue et al. | | |
| 2006/0046102 A1 * | 3/2006 | Bian et al. | ............... | 428/828.1 |
| 2006/0057428 A1 * | 3/2006 | Akagi et al. | ............. | 428/828.1 |
| 2006/0210834 A1 * | 9/2006 | Do et al. | .................. | 428/828.1 |

(Continued)

FOREIGN PATENT DOCUMENTS

JP 2001-059293 3/2001

*Primary Examiner*—Kevin M Bernatz
(74) *Attorney, Agent, or Firm*—Townsend and Townsend and Crew LLP; Darren Gold

(57) ABSTRACT

A bit error rate is improved and, at the same time, an aging change due to thermal fluctuation is decreased. In one embodiment, a magnetic recording medium has first, second, third, and fourth magnetic layers stacked over the underlayer film on a substrate. The product (Brt2) of the residual magnetic flux density and film thickness of the second magnetic layer is smaller than the product (Brt3) of the residual magnetic flux density and film thickness of the third magnetic layer. The second magnetic layer has a thickness larger than that of the third magnetic layer and is anti-ferromagnetically coupled with the first magnetic layer by way of the first non-magnetic intermediate layer. The fourth magnetic layer is formed by way of a second non-magnetic intermediate layer above the third magnetic layer. The product (Brt4) of the residual magnetic flux density and film thickness of the fourth magnetic layer is from about 47% to 52% of the product (Brt_total) of the residual magnetic flux density and film thickness of the entire magnetic layers in a state of residual magnetization with the external magnetic field removed.

9 Claims, 11 Drawing Sheets

| | | | |
|---|---|---|---|
| | 21 | | 1.8nm |
| | 20 | C | 3.0nm |
| 19 Top Mag | | CoCrPtB (12-13-10, 12-13-8) | 8.0/7.0nm |
| 18 Ru2 | | Ru | |
| 17 Upper Mid Mag | | CoCrPtB (12-13-12) | 7.2nm |
| 16 Lower Mid Mag | | CoCrPtBTa (23-13-5-2) | 10nm |
| 15 Ru1 | | Ru | 0.7nm |
| 14 Bottom mag | | CoCrPt (16-9) | 2.5nm |
| | 13 | CrTiB (10-3) | 8nm |
| | | Heating, Surface conditioning | 400°C |
| | 12 | WCo30 | 3nm |
| | 11 | TiCoNi (40-10) | 14nm |
| | 10 | Textured Glass Substrate | |

U.S. PATENT DOCUMENTS

2006/0210835 A1* 9/2006 Do et al. .................. 428/828.1
2006/0263643 A1* 11/2006 Fullerton et al. ......... 428/828.1
2007/0037017 A1* 2/2007 Do et al. .................. 428/828.1

* cited by examiner

Fig. 1

| | | |
|---|---|---|
| 21 | | 1.8nm |
| 20 | C | 3.0nm |
| 19 Top Mag | CoCrPtB(12-13-10, 12-13-8) | 8.0/7.0nm |
| 18 Ru2 | Ru | |
| 17 Upper Mid Mag | CoCrPtB(12-13-12) | 7.2nm |
| 16 Lower Mid Mag | CoCrPtBTa(23-13-5-2) | 10nm |
| 15 Ru1 | Ru | 0.7nm |
| 14 Bottom mag | CoCrPt(16-9) | 2.5nm |
| 13 | CrTiB(10-3) | 8nm |
| | Heating, Surface conditioning | 400°C |
| 12 | WCo30 | 3nm |
| 11 | TiCoNi(40-10) | 14nm |
| 10 | Textured Glass Substrate | |

| | | |
|---|---|---|
| 21 | | 1.8nm |
| 20 | C | 3.0nm |
| 19 Top Mag | CoCrPtB | |
| 18 Ru2 | Ru | 0.6nm |
| 17 Upper Mid Mag | CoCrPtB(12-13-12) | |
| 16 Lower Mid Mag | CoCrPtBTa(22-14-6-2) | |
| 15 Ru1 | Ru | 0.5nm |
| 14 Bottom Mag | CoCrPt(16-9) | 2.5nm |
| 13 | CrTiB(10-3) | 8nm |
| | Heating, Surface conditioning | 355-390°C |
| 12 | WCo30 | 3nm |
| 11 | TiCoNi(40-10) | 14nm |
| 10 | Textured Glass Substrate | |

Fig. 8

| Specimen No. | Lower Mid [nm] | Upper Mid [nm] | Top [nm] | BrtA [nm] | BrtA/Brt | Brt [nm] | Hcr [kA/m] | Δθ50 [deg] | KV/KT | BrOR | Q/W [dB] | NRMSHF | RMSHHF | Rell HF [%] | Snr/AI [dB] | Snr/ANr [dB] | LogBER |
|---|---|---|---|---|---|---|---|---|---|---|---|---|---|---|---|---|---|
| 201 | 11.7 | 7.4 | 8-13-12 | 5.0 | 0.51 | 9.7 | 356 | 6.1 | 85 | 1.28 | -31.4 | .0203 | .0183 | 40.5 | 13.6 | 14.4 | -4.4 |
| 202 | 10.6 | 6.7 | | 4.4 | 0.52 | 8.4 | 353 | 6.5 | 76 | 1.27 | -33.1 | .0197 | .0190 | 41.9 | 14.0 | 14.3 | -4.4 |
| 203 | 11.7 | 7.4 | 10-13-12 | 5.0 | 0.51 | 9.9 | 387 | 6.0 | 91 | 1.27 | -28.1 | .0196 | .0178 | 43.2 | 14.4 | 15.3 | -5.2 |
| 204 | 10.6 | 6.7 | | 4.4 | 0.52 | 8.5 | 387 | 6.4 | 81 | 1.22 | -29.7 | .0195 | .0184 | 44.9 | 14.7 | 15.3 | -5.1 |
| 205 | 11.7 | 7.4 | 12-13-12 | 5.0 | 0.50 | 9.9 | 393 | 4.5 | 87 | 1.35 | -24.7 | .0182 | .0160 | 43.9 | 15.0 | 16.0 | -5.8 |
| 206 | 10.6 | 6.7 | | 4.4 | 0.50 | 8.8 | 386 | 4.4 | 78 | 1.40 | -26.4 | .0175 | .0154 | 45.9 | 15.6 | 16.6 | -6.3 |
| 207 | 11.7 | 7.4 | 14-13-12 | 5.0 | 0.50 | 10.1 | 371 | 4.4 | 80 | 1.39 | -24.8 | .0167 | .0155 | 41.6 | 15.3 | 15.9 | -5.7 |
| 208 | 10.6 | 6.7 | | 4.4 | 0.50 | 8.8 | 380 | 4.3 | 74 | 1.36 | -26.6 | .0169 | .0148 | 43.1 | 15.9 | 16.5 | -6.1 |
| 209 | 11.7 | 7.4 | 12-13-10 | 5.0 | 0.51 | 9.9 | 379 | 4.4 | 83 | 1.35 | -26.7 | .0170 | .0155 | 43.9 | 15.5 | 16.2 | -6.2 |
| 210 | 10.6 | 6.7 | | 4.4 | 0.51 | 8.6 | 375 | 4.3 | 72 | 1.38 | -27.8 | .0167 | .0154 | 44.9 | 15.7 | 16.4 | -6.5 |
| 211 | 11.7 | 7.4 | 12-13-14 | 5.0 | 0.49 | 10.2 | 351 | 4.5 | 78 | 1.42 | -25.0 | .0163 | .0148 | 40.1 | 15.2 | 15.9 | -5.9 |
| 212 | 10.6 | 6.7 | | 4.4 | 0.49 | 8.9 | 363 | 4.5 | 72 | 1.43 | -26.1 | .0157 | .0146 | 41.3 | 15.6 | 16.2 | -5.8 |

Fig. 11

| Specimen No. | Lower Mid [nm] | Upper Mid [nm] | Top [nm] | Brt4 [Tm] | Brt4/Brt | Brt [Tm] | Hcr [kA/m] | Δθ50 [deg] | Kv/kT | BrCR | O/W [dB] | MNxHF | kNxHF | ReHF [%] | Smf/N [dB] | Smf/Nmf [dB] | LogBER |
|---|---|---|---|---|---|---|---|---|---|---|---|---|---|---|---|---|---|
| 301 | 11.7 | 9-13-12 | 10.7 | 5.0 | 0.49 | 10.2 | 363 | 4.4 | 91 | 1.36 | -25.5 | .0211 | .0172 | 46.1 | 14.5 | 16.1 | -5.4 |
| 302 | 10.6 | | 9.4 | 4.4 | 0.48 | 9.1 | 373 | 4.4 | 86 | 1.36 | -26.0 | .0211 | .0170 | 47.3 | 14.7 | 16.3 | -5.6 |
| 303 | 11.7 | 10-13-12 | 10.7 | 5.0 | 0.50 | 10.0 | 369 | 4.5 | 92 | 1.38 | -25.9 | .0191 | .0161 | 47.0 | 15.4 | 16.8 | -5.9 |
| 304 | 10.6 | | 9.4 | 4.4 | 0.49 | 9.0 | 369 | 4.5 | 83 | 1.36 | -26.6 | .0193 | .0162 | 47.9 | 15.5 | 16.9 | -6.2 |
| 209 | 11.7 | 12-13-12 | 10.0 | 5.0 | 0.51 | 9.9 | 379 | 4.4 | 83 | 1.35 | -26.7 | .0170 | .0155 | 43.9 | 15.5 | 16.2 | -6.2 |
| 210 | 10.6 | | 8.8 | 4.4 | 0.51 | 8.6 | 375 | 4.3 | 72 | 1.33 | -27.8 | .0167 | .0154 | 44.9 | 15.7 | 16.4 | -6.5 |
| 305 | 11.7 | 14-13-12 | 10.7 | 5.0 | 0.50 | 9.9 | 379 | 4.5 | 85 | 1.32 | -27.0 | .0177 | .0155 | 43.0 | 15.2 | 16.3 | -5.9 |
| 306 | 10.6 | 22-14-6-2 | 9.4 | 4.4 | 0.50 | 8.8 | 380 | 4.4 | 76 | 1.35 | -28.7 | .0169 | .0153 | 43.8 | 15.7 | 16.4 | -6.1 |
| 307 | 11.7 | 12-13-10 | 9.6 | 5.0 | 0.50 | 10.1 | 379 | 4.4 | 88 | 1.37 | -26.6 | .0182 | .0158 | 46.7 | 15.7 | 16.8 | -6.4 |
| 308 | 11.6 | | 8.5 | 4.4 | 0.50 | 8.8 | 375 | 4.2 | 76 | 1.37 | -28.4 | .0178 | .0156 | 46.8 | 15.9 | 16.8 | -6.5 |
| 309 | 11.7 | 12-13-14 | 10.7 | 5.0 | 0.50 | 9.9 | 357 | 4.6 | 81 | 1.35 | -27.0 | .0176 | .0153 | 43.1 | 15.3 | 16.3 | -6.0 |
| 310 | 10.6 | | 9.4 | 4.4 | 0.49 | 8.9 | 365 | 4.5 | 74 | 1.35 | -28.5 | .0171 | .0153 | 43.4 | 15.5 | 16.3 | -6.1 |

Fig. 14

| Specimen No. | Lower Mid [ms] | Upper Mid [ms] | Top [ms] | Brt4 [Tms] | Br-t4/Br·t | Br·t [Tms] | Hcr [kA/m] | Δθ50 [deg] | Kv/Kt | Br·OR | θ/R [deg] | kW/kHF | kW/kBHF | RsWHF [%] | Smf/N [dB] | Smf/Nsf [dB] | LogBER |
|---|---|---|---|---|---|---|---|---|---|---|---|---|---|---|---|---|---|
| 401 | 20-14-6-2 | | | 9.6 | 5.0 | 0.49 | 10.2 | 393 | 4.5 | 85 | 1.35 | -26.7 | .0204 | .0172 | 44.6 | 14.6 | 16.0 | -5.7 |
| 402 | | 6.1 | | 8.5 | 4.4 | 0.49 | 8.9 | 385 | 4.4 | 75 | 1.39 | -28.6 | .0168 | .0164 | 45.5 | 16.3 | 16.5 | -6.2 |
| 403 | 22-14-4-2 | 5.4 | | 9.6 | 5.0 | 0.50 | 9.9 | 385 | 4.4 | 89 | 1.38 | -24.8 | .0203 | .0169 | 45.6 | 14.6 | 16.1 | -5.9 |
| 404 | | 6.5 | | 8.5 | 4.4 | 0.50 | 8.8 | 396 | 4.3 | 81 | 1.43 | -26.1 | .0175 | .0164 | 47.3 | 16.0 | 16.6 | -6.5 |
| 209 | 22-14-6-2 | 5.8 | 12-13-10 | 10.0 | 5.0 | 0.51 | 9.9 | 379 | 4.4 | 83 | 1.35 | -26.5 | .0196 | .0170 | 44.6 | 14.6 | 15.8 | -6.5 |
| 210 | | 7.4 | 12-13-12 | 8.8 | 4.4 | 0.51 | 8.6 | 375 | 4.3 | 72 | 1.38 | -28.3 | .0184 | .0163 | 47.9 | 15.7 | 16.7 | -6.6 |
| 405 | 22-14-6 | 6.7 | | 9.6 | 5.0 | 0.49 | 10.2 | 417 | 4.3 | 86 | 1.41 | -23.4 | .0189 | .0175 | 43.2 | 14.9 | 15.6 | -5.4 |
| 406 | | 2.8 | | 8.5 | 4.4 | 0.49 | 9.0 | 408 | 4.3 | 77 | 1.41 | -25.7 | .0177 | .0170 | 45.2 | 15.8 | 16.2 | -5.8 |
| 407 | 24-14-6 | 2.4 | | 9.6 | 5.0 | 0.50 | 10.1 | 394 | 4.3 | 84 | 1.39 | -25.0 | .0203 | .0170 | 45.1 | 14.7 | 16.3 | -5.8 |
| 408 | | 5.4 | | 8.5 | 4.4 | 0.50 | 8.9 | 388 | 4.3 | 75 | 1.39 | -27.1 | .0182 | .0162 | 47.3 | 15.9 | 17.0 | -6.3 |

MAGNETIC RECORDING MEDIUM FOR HIGH DENSITY RECORDING

CROSS-REFERENCES TO RELATED APPLICATIONS

This application claims priority from Japanese Patent Application No. JP2005-184375, filed Jun. 24, 2005, the entire disclosure of which is incorporated herein by reference.

BACKGROUND OF THE INVENTION

The present invention relates to a magnetic recording medium capable of recording a great amount of information and, more in particular, it relates to a magnetic recording medium suitable for high-density magnetic recording.

There has been an increasing demand for magnetic storage apparatus typically represented by magnetic disk apparatus with a greater capacity. In order to cope with the demand, a development has been required for a magnetic head with high sensitivity and a recording medium capable of obtaining high signal output-to-noise ratio (S/N).

Generally, a recording medium comprises a first underlayer referred to as a seed layer formed over a substrate, a second underlayer of a body-centered cubic structure comprising a chromium alloy, a magnetic layer and a protective layer comprising carbon as a main component. An alloy having a hexagonal close-packed structure comprising cobalt as a main component is used for the magnetic layer.

To improve S/N, it is effective to crystallographically orient a magnetic layer such that the (11.0) plane or (10.0) plane is substantially in parallel with the surface of a substrate and direct the c-axis of the hexagonal close packed structure as an axis of easy magnetization in the direction within the plane of the film. It is known that the crystallographic orientation of the magnetic layer can be controlled by the seed layer and such orientation can be obtained by using tantalum (Ta) or W—Co alloy, etc. for the seed layer. Further, it has been known that the magnetic characteristic in the circumferential direction can be improved by applying mechanical texturing to the surface of the substrate and introducing magnetic anisotropy in the circumferential direction.

For the improvement of S/N, it is effective to adopt a multi-layered structure for the magnetic layer, refine the crystal grain size or decrease Brt which is a product of the residual magnetic flux density Br and the film thickness (t) of a magnetic layer. Patent Document 1 (Japanese Patent Laid-open No. 2001-56923) proposes a magnetic recording medium in which an underlayer is disposed on a substrate. The document describes that a stacked magnetic film comprising at least two magnetic layers of different compositions in contact with each other is disposed on the underlayer as a multi-layered structure by way of a non-magnetic layer such as one made of ruthenium. It further proposes a magnetic recording medium including an underlayer over a substrate and a magnetic recording layer formed thereabove in which the magnetic recording layer has a multi-layered structure vertically separated by an intermediate layer. The intermediate layer is formed of one of materials selected from the group consisting of Ru, Rh, Ir, and alloys thereof selected from the range of from 0.2 to 0.4 nm and from 1.0 to 1.7 nm, and the magnetization directions of the magnetic recording layers separated vertically by the intermediate layer are in parallel with each other. Use of the magnetic recording medium described above provides a magnetic recording medium having a magnetic recording layer of a multi-layered structure intended for reducing noise while maintaining magnetic characteristic having thermal stability.

Since an extreme miniaturization of the crystal grains used for the magnetic recording layer or large reduction of the Brt results in the degradation of the thermal stability, the reduction of noise is limited. In recent years, an anti-ferromagnetically coupled (AFC) medium to be described later has been proposed as a technique capable of compatibilizing the thermal stability and the noise reduction. This is a dual layered structure of two anti-ferromagnetically coupled magnetic layers by way of an Ru intermediate layer which can set the Brt lower while maintaining the thickness of the large ferromagnetic film as it is, compared with a medium comprising a single layered magnetic layer. Accordingly, this could reduce the medium noise while maintaining the thermal stability.

Further, with an aim of providing a magnetic recording medium which is favorable in the thermal fluctuation characteristic (thermal stability) and favorable in the read/write characteristic such as coercivity squareness (S), pulse width, overwrite characteristic, medium noise (S/N ratio), etc. Patent Document 2, (Japanese Patent Laid-open No. 2004-355716) for example, proposes a magnetic recording medium. This magnetic recording medium comprises an underlayer, a first magnetic layer, a first intermediate layer, a second magnetic layer, a second intermediate layer, a third magnetic layer, a protective layer, and a lubricant layer which are formed in this order above the substrate. In addition, each of the third magnetic layer and the second magnetic layer comprises a cobalt (Co)-based alloy containing at least platinum (Pt), chromium (Cr), and boron (B). The concentration of platinum contained in the second magnetic layer is less than the concentration of platinum contained in the third magnetic layer and, at the same time, platinum contained in the third magnetic layer is 15 at. % or less. The concentration of chromium contained in the third magnetic layer is 15 at. % or more and 18 at. % or less, and the concentration of boron contained in the third magnetic layer is 7 at. % or more and 10 at. % or less.

BRIEF SUMMARY OF THE INVENTION

To attain further higher density magnetic recording, it is necessary to improve the magnetic recording medium described in Patent Document 2, thereby further reducing thermal demagnetization and, at the same time, improving the bit error rate.

A feature of the present invention is to improve the bit error rate and, at the same time, reduce the aging change due to thermal fluctuation.

A magnetic recording medium includes an underlayer film, a magnetic film, and a protective film formed successively above a substrate, in which the magnetic film has stacked first, second, third, and fourth magnetic layers, the product (Brt2) of the residual magnetic flux density and the film thickness of the second magnetic layer is less than the product (Brt3) of the residual magnetic flux density and the film thickness of the third magnetic layer, the second magnetic layer has a thickness larger than that of the third magnetic layer and is coupled anti-ferromagnetically with the first magnetic layer by way of the first non-magnetic intermediate layer, the fourth magnetic layer is formed by way of the second non-magnetic intermediate layer above the third magnetic layer, and the product (Brt4) of the residual magnetic flux density and the film thickness of the fourth magnetic layer is about one-half of the product (Brt_total) of the residual magnetic flux density and the film thickness of the entire magnetic layers in a state of residual magnetization with the external magnetic field removed.

According to the present invention, the bit error rate can be improved and, at the same time, the aging change caused by thermal fluctuation can be reduced.

BRIEF DESCRIPTION OF THE DRAWINGS

FIG. 2 is a diagram showing magnetic characteristics and electromagnetic conversion characteristics of media formed by changing the thickness of a second non-magnetic intermediate layer in embodiment 1.

FIG. 7 is a schematic view showing a cross sectional structure of a magnetic recording medium of Embodiment 2.

FIG. 8 is a diagram showing magnetic characteristics and electromagnetic conversion characteristics of media formed by changing the composition of a fourth magnetic layer of Embodiment 2.

FIG. 11 is a diagram showing magnetic characteristics and electromagnetic conversion characteristics of media formed by changing the composition of a third magnetic layer of Embodiment 3.

FIG. 12 is a graph showing the relationship between KV/kT and a bit error rate in logarithmic expression (logBER) of Embodiment 3.

FIG. 13 is a schematic view showing a cross-sectional structure of a magnetic recording medium of Embodiment 4.

FIG. 14 is a diagram showing magnetic characteristics and electromagnetic conversion characteristics of media formed by changing the thickness of a second magnetic layer in Embodiment 4.

FIG. 15 is a graph showing the relationship between KV/kT and a bit error rate in logarithmic expression (logBER) of Embodiment 4.

DETAILED DESCRIPTION OF THE INVENTION

Specific embodiments of the present invention will be below described specifically with reference to the drawings.

Embodiment 1

Figure 1:
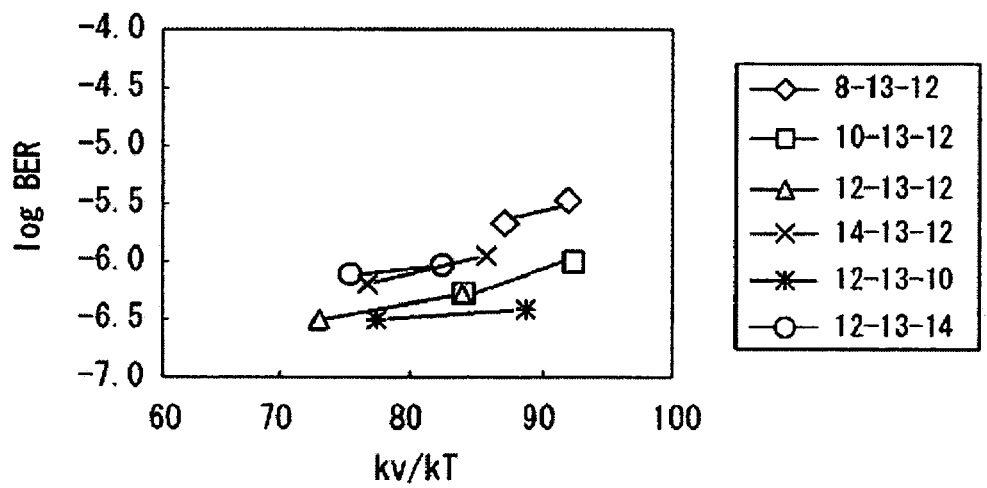
FIG. 1 is a schematic view showing a cross-sectional structure of a magnetic recording medium of Embodiment 1.
Figure 1:
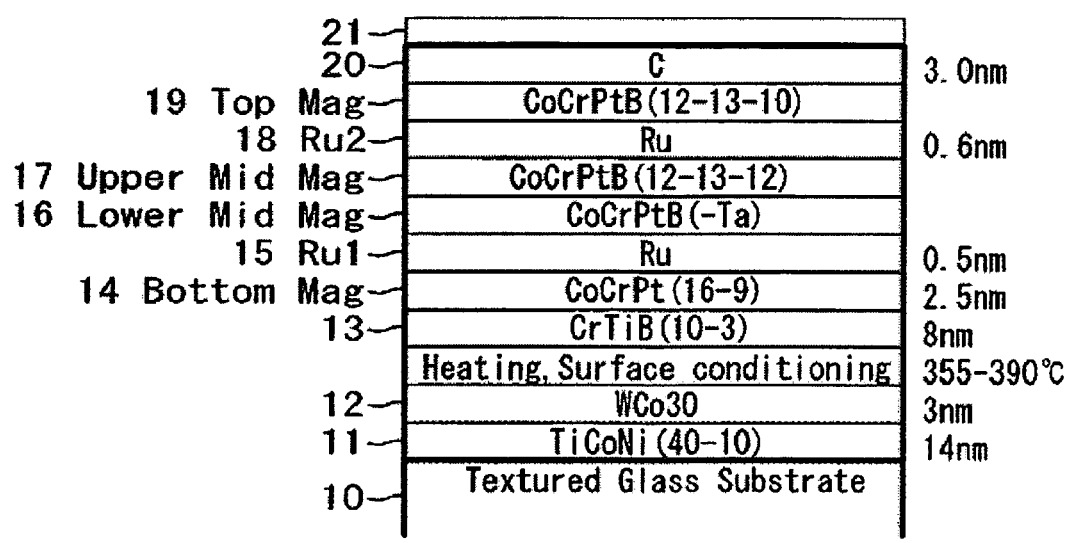
Figure 1:
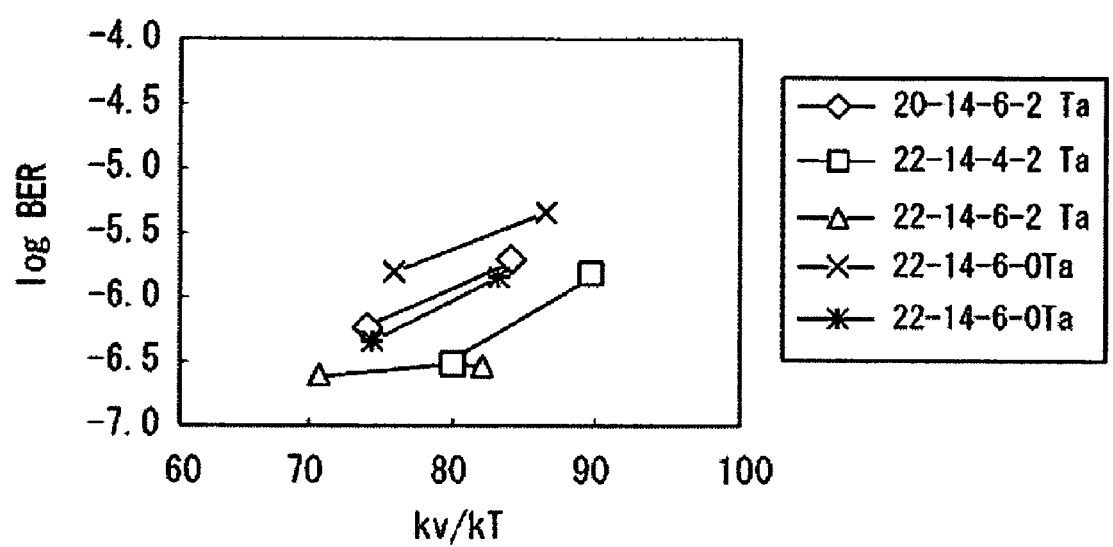

FIG. 1 shows a cross sectional structure of Embodiment 1 of a magnetic recording medium of the present invention. An aluminosilicate glass substrate 10 chemically reinforced at the surface was put to alkali cleaning. After drying, an argon (Ar) gas was introduced in vacuum, and a Ti-40 at. % Co-10 at. % Ni alloy formed by adding 40 atomic % (hereinafter referred to as at. %) cobalt and 10 at. % nickel to titanium of 14 nm thick as a first underlayer 11, and a W-30 at. % Co alloy layer of 3 nm thick comprising tungsten (W) as a main component as a second underlayer were formed by a DC magnetron sputtering method at room temperature. Then, after heating the substrate to reach a temperature of about 400° C. in an atmosphere with residual gas being controlled by a lamp heater, a Cr-10 at. % Ti-3 at. % B alloy of 10 nm thick was formed as a third underlayer 13. Further, a first magnetic layer 14 of 2.5 nm thick comprising a Co-14 at. % Cr-6 at. % Pt alloy, a first non-magnetic intermediate layer 15 of 0.7 nm thick comprising Ru, a second magnetic layer 16 and a third magnetic layer 17 each comprising cobalt (Co) as a main component, a second non-magnetic intermediate layer 18 comprising ruthenium (Ru), and a fourth magnetic layer 19 comprising Co as a main component were formed successively, and a carbon film 20 of 3 nm thick was formed as a protective layer. A bias voltage at −200V was applied to the substrate when the second, third, and fourth magnetic layers were formed.

After formation of the carbon film, a lubricant comprising a perfluoro alkyl polyether as a main component was coated to form a lubrication layer 21 of 1.8 nm thick. The multi-layered film was formed by using a single disk sputtering apparatus (MDP250B) manufactured by Intevac Corp. The base vacuum degree of the sputtering apparatus was 1.0 to $1.2 \times 10^{-5}$ Pa and the tact was set to 7 sec. From the first underlayer to the upper magnetic layer were formed in an Ar gas atmosphere at 0.93 Pa, and the carbon protective film was formed in a mixed gas atmosphere with addition of 10% nitrogen to Ar.

A Co-23 at. % Cr-13 at. % Pt-5 at. %-2 at. % Ta alloy target was used for formation of the second magnetic layer 16 and the thickness was set to 10 nm. A Co-12 at. % Cr-13 at. % Pt-12 at. % B alloy target was used for formation of the third magnetic layer 17 and the thickness was set to 7.2 nm. A Co-12 at. % Cr-13 at. % Pt-10 at. % B alloy target of 8.0 nm thick and a Co-12 at. % Cr-13 at. % Pt-8 at. % B alloy target of 7.0 nm thick were used for formation of the fourth magnetic layer 19. The targets of the compositions described above were formed directly on a glass substrate and the compositions were analyzed by plasma emission spectroscopy (ICPS). As a result, the target composition and the thin film composition agreed approximately with each other.

In this case, since the second magnetic layer 16 is anti-ferromagnetically coupled with the first magnetic layer 14 by way of the first non-magnetic intermediate layer 15, the magnetization directions of the second magnetic layer 16 and the first magnetic layer 14 are anti-parallel to each other. Further, the magnetization directions of the fourth magnetic layer 19 and the third magnetic layer 17 are parallel to each other so as to render the coercivity of the respective layers to 160 kA/m or more.

The designed value for the product Brt of the residual magnetic flux density Br and the thickness t in each of the magnetic layers is as described below. Brt 1 of the first magnetic layer is 0.9 Tnm, Brt2 of the second magnetic layer is 2.0 Tnm, Brt3 of the third magnetic layer is 3.7 Tnm, and Brt4 of the fourth magnetic layer is 4.8 Tnm. When the second non-magnetic intermediate layer was actually formed, Brt decreased by about 0.3 Tnm at maximum, and the Brt4 of the fourth magnetic layer was 4.6 Tnm in a residual magnetization state after removal of the external magnetic field. That is, the magnetic recording medium was such that the ratio of Brt4 of the fourth magnetic layer in the residual magnetization state after removal of the external magnetic field for the product of the residual magnetic flux density and the film thickness of the entire magnetic layer was 4.6/9.4× 100=48.9%, which was substantially one-half of the entire residual magnetization. About one-half of the entire residual magnetization means from about 47% to 52% of the product (Brt_total) of the residual magnetic flux density and the film thickness of the entire magnetic layer (refer to FIGS. 2, 8, 11 and 14).

The magnetic recording media formed by changing the thickness of the second non-magnetic intermediate layer 18 were combined with a composite type head having a writing electromagnetic induction type magnetic head and a reading spin-bulb type magnetic head together, and the electromagnetic conversion characteristic was evaluated on a spin stand. The head used for measurement had a geometrical writing track width Tww (opt) of 240 nm, a geometrical reading tack width Twr (opt) of 130 nm, an inter-shield gap length Gs of 65 nm, a writing gap length of 110 nm, a head offset during writing/reading of 0.18 μm, a writing current Iw of 37 mA, an erasing current Ie of 40 mA, a sensing current Is of 2.8 mA, and a maximum linear recording density Hf of 810.2 kFCI (31.9 kilo flux change per 1 mm). When reading signals were magnetically measured, the writing track width Tww (mag) was 230 nm and the reading track width Twr (mag) was 188 nm. A signal at 135 kFCI as 1F signals at low density recording (5.31 kilo flux change per 1 mm) and signals at 810.2 kFCI as Hf signals at high recording density were overwritten and the over writing characteristic (O/W) was determined based on the attenuation ratio of the 1F signals. The measurement was conducted while setting the skew angle to 0°.

Figure 2:
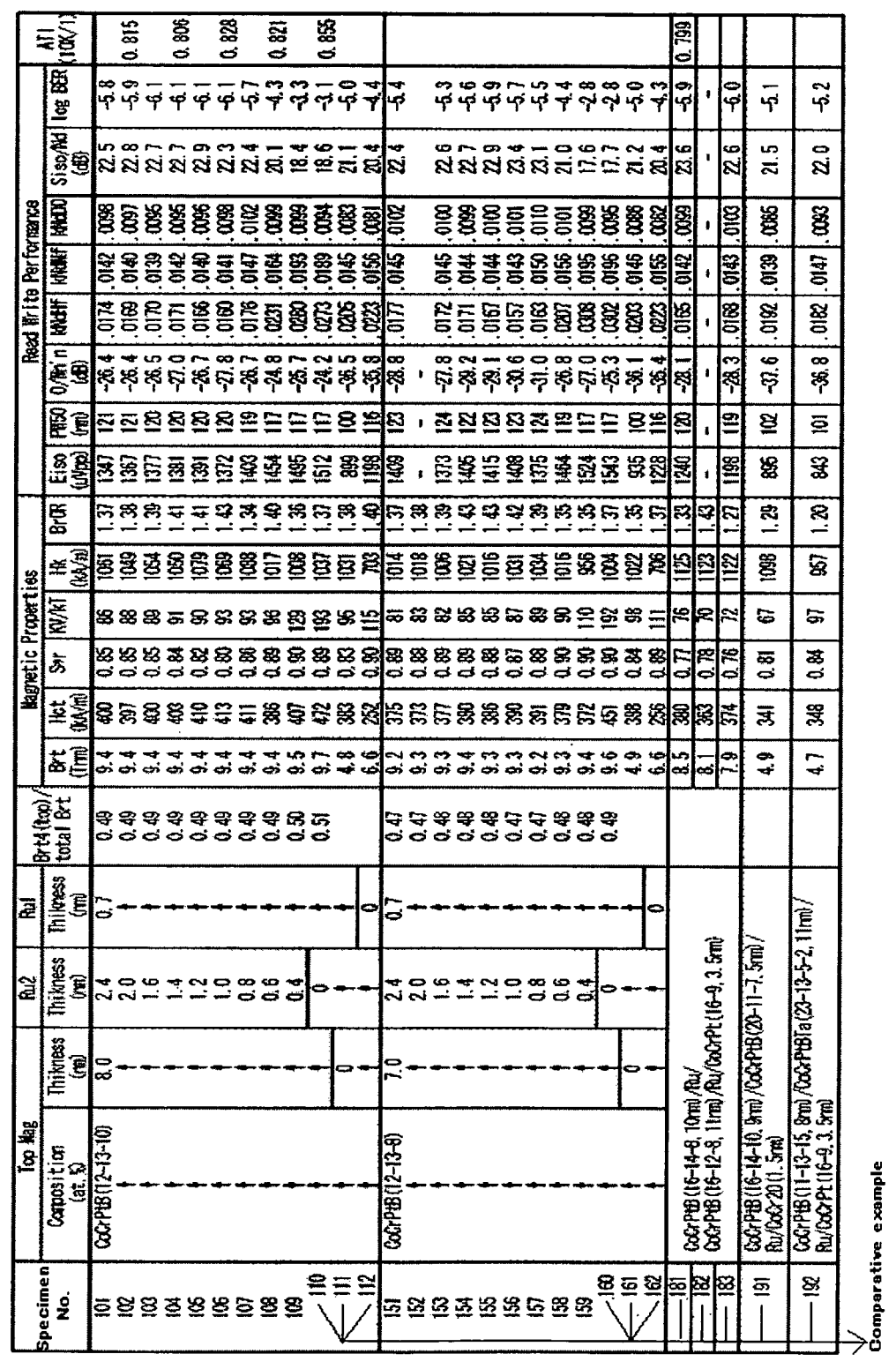

FIG. 2 shows the magnetic characteristic and electromagnetic conversion characteristic of media formed by changing the film thickness of the second non-magnetic intermediate layer 18. At first, a description is to be made for the result of using Co-12 at. % Cr-13 at. % Pt-10 at. % B as the fourth magnetic layer. Compared with Comparative Example 110 not provided with the second non-magnetic intermediate layer 18, the KV/kT decreased greatly as the thickness of the second non-magnetic intermediate layer 18 increased to 0.4 nm or more. When the second non-magnetic intermediate layer 18 was formed to 0.6 nm or more, the KV/kT decreased to one-half compared with Comparative Example 110, and the KV/kT decreased to the same extent as that in Comparative Example 111 not formed with the fourth magnetic layer. When the second non-magnetic intermediate layer was formed to 0.6 nm or more, the coercivity was substantially equal or was somewhat larger compared with Comparative Example 111 not formed with the fourth magnetic layer.

As shown in FIG. 2, a favorable bit error rate is obtained in a case of using a Co-12 at. % Cr-13 at. % Pt-10 at. % B alloy as the third magnetic layer. In particular, the bit error rate (logBER) is improved by one digit or more compared with Comparative Example 111 in a case of increasing the thickness of the second non-magnetic intermediate layer from 1.0 nm to 1.6 nm.

Figure 3:
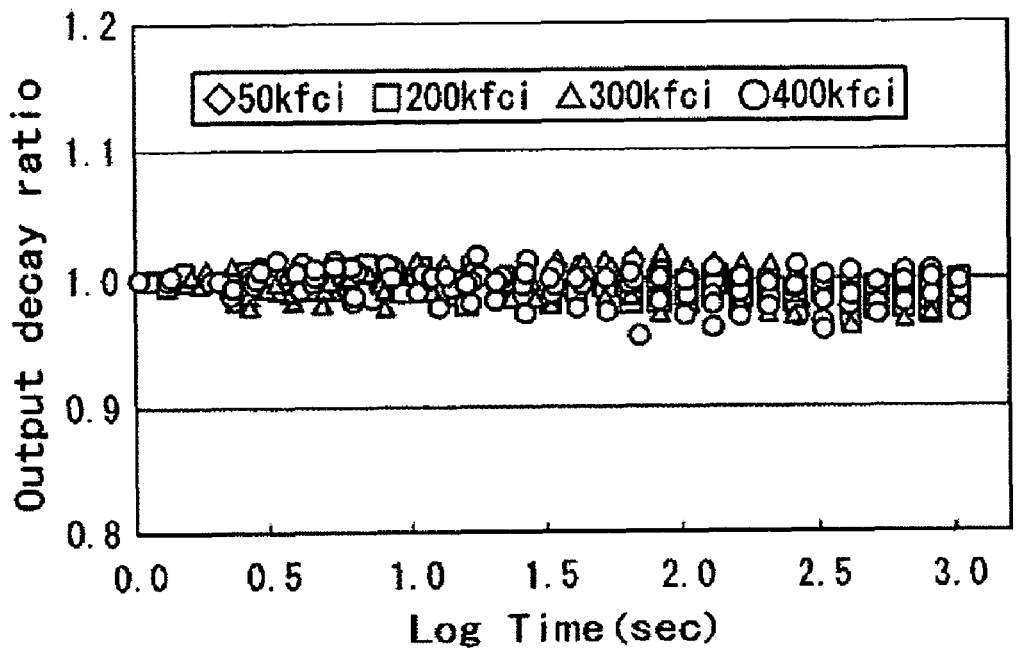
FIG. 3 is a graph showing the result of measuring the aging change of a read output at 65° C. for a medium of specimen No. 106.
Figure 4:
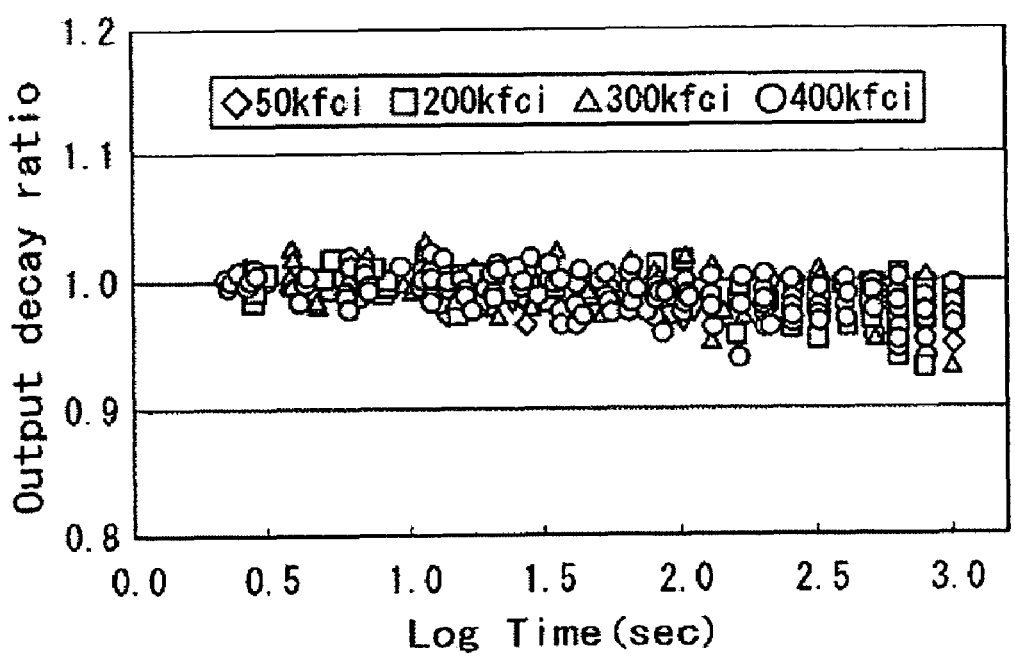
FIG. 4 is a graph showing the result of measuring the aging change of a read output at 65° C. for a medium of Comparative Example 181.

FIG. 3 shows the results of measuring the aging change of the read output at 65° C. for a medium specimen 106. The output is decreased by 0.34% per digit of time in a case of recording at 50 kFCI. In a case of recording at the recording density of 200 kFCI, 300 kFCI, 400 kFCI, a decrease of the output by 0.43%, 0.45%, and 0.45% per digit of time is observed respectively. FIG. 4 shows the results of measuring the aging change of the read output also at 65° C. for the medium of Comparative Example 181 as the medium of existent constitution as the comparative example. As apparent at a glance, a decrease of the output is larger by about three times in view of the thermal demagnetization of the comparative example, compared with the medium of specimen No. 106. The output decreases in the linear recording densities are 1.39%, 1.14%, 1.21%, and 1.24%, respectively, per digit of time.

Figure 5:
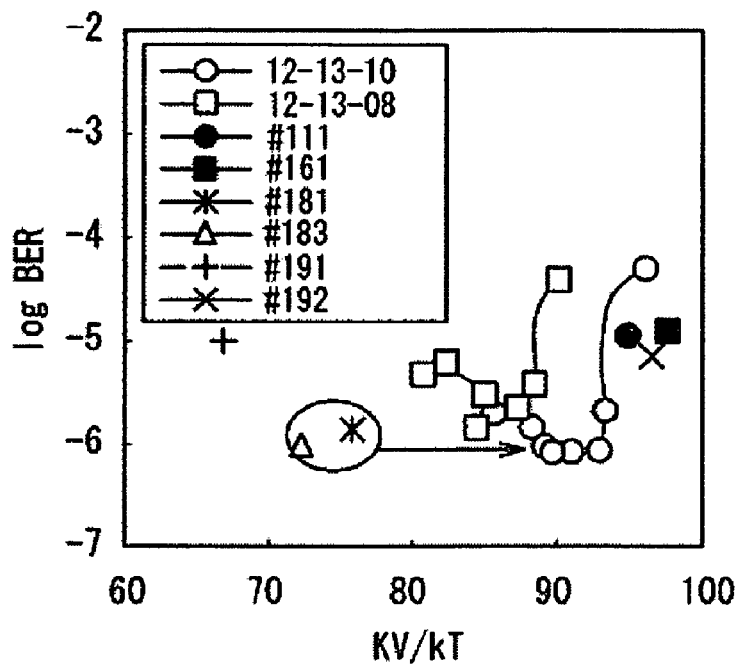
FIG. 5 is a graph showing the relationship between KV/kT and a bit error rate in logarithmic expression (logBER) of Embodiment 1.

FIG. 5 shows the relationship between the KV/kT and the bit error rate by logarithmic indication (logBER). In view of the relationship, the KV/kT can be increased while maintaining the logBER compared with Comparative Examples 181 and 183 of the existent constitution and, as also apparent from the result shown in FIG. 3, the thermal fluctuation can be decreased and the reliability can be improved in the media of this embodiment.

The S/Nd of the medium of specimen No. 106 was improved by about 2.2 dB compared with S/Nd of Comparative Example 111 not formed with the fourth magnetic layer. The value does not reach 3 dB that is theoretically expected. However, the medium of specimen No. 106 has an allowable overwriting characteristic, attains a favorable bit error rate and, at the same time, attains remarkable improvement in S/Nd.

The fourth magnetic layer is formed by way of a Ru intermediate layer after formation of the third magnetic layer so that Brt is about twice that of Comparative Example 111. Thus, a medium is obtained which has comparable overwriting characteristic and an improved bit error rate, compared with Comparative Examples 110 to 112 not formed with the fourth magnetic layer.

In the existent type stacked AFC media shown in Comparative Examples 181 to 183, since the magnetic layer of the same composition as the fourth magnetic layer in view of the Cr concentration is formed directly by way of the Ru intermediate layer above the first magnetic layer without forming the second magnetic layer of high Cr concentration, while the coercivity is substantially the same, the KV/kT as an index of the thermal fluctuation is as small as 70 to 76. On the other hand, the overwriting characteristic is comparable and the BER can be improved in this embodiment although the Brt is as large as about 10 Tnm. Since magnetization reversal in the magnetic layer remote from the main magnetic pole of the head is facilitated to anti-ferromagnetically couple the second magnetic layer with the first magnetic layer, the thickness of the effective read/write layer can decrease and at the same time, the crystallinity can be improved by growing the second magnetic layer to a large thickness and the crystallinity can be improved such that the third magnetic layer and the fourth magnetic layer are thermally stable. Furthermore the synergistic effect of avoiding degradation of the writing performance at a relatively thin film thickness by constituting the third and the fourth magnetic layers near the main magnetic pole piece of the writing head with a CoPt alloy containing Cr at low concentration and B at high concentration and by miniaturizing crystal grains by the addition of B at high concentration to decrease the noises should allow improvement of the BER even though Brt is relatively high.

Then, an Adjacent Track Interference (ATI) characteristic was evaluated for the medium of the invention. ATI is an index representing interference between adjacent tracks upon writing. It is defined depending on the extent of the effect on adjacent track signals in the writing track upon signal writing, that is, the extent of erasing the adjacent track signals. The ATI characteristic was measured under sectoral servo for eliminating the positional displacement of the head. The writing width was 180 nm and the reading width was 85 nm in the measured head. The track pitch was set to 120 ktpi (212 nm). At first signals at 135 kFCI (5.31 kilo flux change per 1 mm) were written, a track profile was measured and the signal level was defined as ATI (0). Then, after writing signals at 81 kFCI (3.19 kilo flux change per 1 mm) for once in adjacent tracks on both sides, the track profile was measured in the same manner. The signal level at 135 kFCI was defined as ATI(1). Further, the signal level at 135 kFCI after writing signals at 81 kFCI for 10,000 times was defined as ATI(10k). The ATI characteristic was defined by normalizing ATI(10k) with ATI (1). In order to cancel the effect of the writing head width on the result, the normalization is made not by ATI(0) but by ATI(1).

Figure 6:
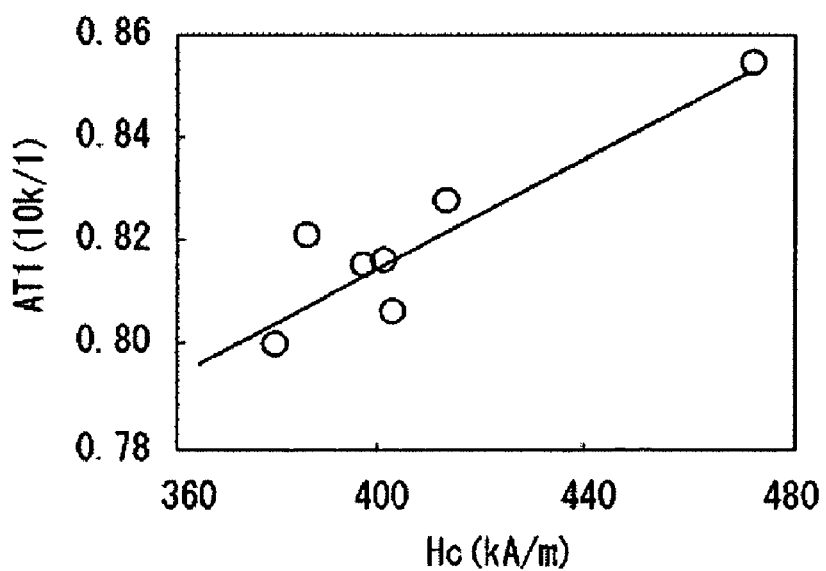
FIG. 6 is a graph showing the relationship between the measuring result for ATI and coercivity Hc of a medium.

FIG. 6 shows the relationship between the measurements of the ATI and the coercivity Hc of a medium. As the value on the ordinate in FIG. 6 is increased, signals in adjacent tracks are less eliminated, showing that the ATI characteristic is favorable. Detailed data are shown on the right in FIG. 2. Any of the media of the invention has favorable ATI characteristic compared with Comparative Example 181. Also in view of the data, the ATI characteristic tends to be better as the Hc is larger.

Also in a case of using a Co-12 at. % Cr-13 at. % Pt-8 at.B alloy with reduced concentration of B instead of the Co-12 at. % Cr-13 at. % Pt-10 at.B alloy as the fourth magnetic layer, as specimen Nos. 151 to 159 shows, the KV/kT decreases greatly as compared with Comparative Example 160 not provided with the second intermediate layer 18, as the thickness of the second intermediate layer 18 increases to 0.4 nm or more. In addition, KV/kT decreases to a level less than the KV/kT of Comparative Example 160 when the second intermediate layer 18 is formed to 0.6 nm or more. However, the KV/kT is 81 even in specimen No. 151 and a sufficiently larger KV/kT can be obtained compared with Comparative Examples 181 to 183.

A medium was manufactured experimentally in the same manner as in specimen No. 106 of Embodiment 1 except that the film thickness ratio between the second magnetic layer and the third magnetic layer was changed. As a result, in a case of forming the second magnetic layer to 4 nm and the third magnetic layer to 10 nm, while the Brt was 9.7 Tnm, the TV/kT was as low as 76.2 to increase thermal fluctuation. As apparent from the comparison, it is possible to improve the KV/kT and decrease the thermal fluctuation by increasing the thickness of the second magnetic layer.

Embodiment 2

FIG. 7 shows a constitutional cross-sectional view of a medium examined in this embodiment. A magnetic recording medium was formed in the same manner as in Embodiment 1 except that the following conditions were changed among the conditions for manufacturing Embodiment 1.

(1) To control the coercivity, the heating temperature for the substrate was used as a variant, which was controlled from 350° C. to 390° C.

(2) The thickness of Ru formed as the first intermediate layer was set to about 0.5 nm.

(3) The thicknesses of the second magnetic layer and the third magnetic layer were changed.

(4) The composition and the thickness of the fourth magnetic layer were changed.

(5) The thickness of Ru formed between the third magnetic layer and the fourth magnetic layer was fixed at about 0.6 nm.

A combination of the thickness for the second magnetic layer (Co-22 at. % Cr-14 at. % Pt-6 at. % B-2 at. % Ta) and the third magnetic layer (Co-12 at. % Cr-13 at. % Pt-12 at. % B) includes two cases of (11.7 mm, 7.4 nm) and (10.6 nm, 6.7 nm). The designed value for each Brt is: (Brt2, Brt3)=(2.1 Tnm, 4.0 nm), (1.9 Tnm, 3.6 Tnm).

As the composition of the fourth magnetic layer, Co-8 at. % Cr-13 at. % Pt-12 at. % B, Co-10 at. % Cr-13 at. % Pt-12 at. % B, Co-12 at. % Cr-13 at. % Pt-12 at. % B, Co-14 at. % Cr-13 at. % Pt-12 at. % B, Co-12 at. % Cr-13 at. % Pt-10 at. % B, Co-12 at. % Cr-13 at. % Pt-14 at. % B were examined.

FIG. 8 shows the relationship between the magnetic characteristic and electromagnetic conversion characteristic of the media. While the specification of the head used for evaluation was the same as that in Embodiment 1, a head different from that in Example 1 was used.

In a case of using a Co-8 at. % Cr-13 at. % Pt alloy as the fourth magnetic layer (Top), in order to attain 5.0 Tnm (Specimen No. 201) and 4.4 Tnm (Specimen No. 202) as the designed values for the Brt4 of the Top by way of the second non-magnetic intermediate layer on the third magnetic layer, it was necessary to reduce the thicknesses of the magnetic layers to as thin as 7.8 nm and 6.8 nm respectively. Further, in a case of using a Co-10 at. % Cr-13 at. % Pt-12 at. % B alloy as the fourth magnetic layer (Top), for attaining Brt4 of the Top from 5.0 Tnm to 4.4 Tnm, it was necessary to set the thickness of the magnetic layers to 8.6 nm and 7.6 nm respectively. Since the films of the compositions described above have relatively high magnetic flux density, the thickness of the magnetic layers has to be reduced in order to set Brt to a desired value. However, if the magnetic layer is excessively thin, the crystallinity in view of the in-plane orientation is sometimes lowered as shown by $\Delta\theta$ 50 in FIG. 8.

Figures 9, 10:
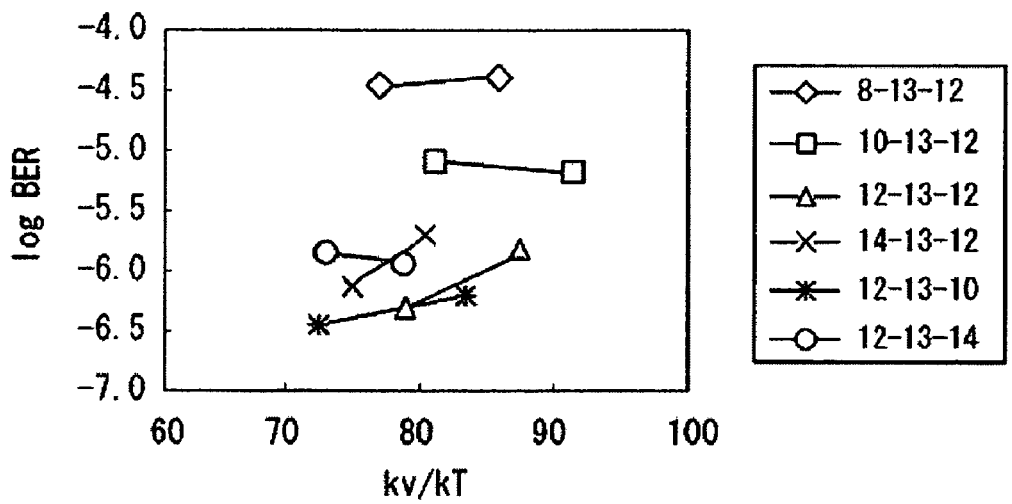
FIG. 9 is a graph showing the relationship between KV/kT and a bit error rate in logarithmic expression (logBER) of Embodiment 2.
FIG. 10 is a schematic view showing a cross-sectional structure of a magnetic recording medium of Embodiment 3.

FIG. 9 shows the relationship between the LogBER and the KV/kT in Embodiment 2. To be more specific, FIG. 9 shows that the fourth magnetic layer having the KV/kT of 80 or more and being able to decrease the logBER is a Co-12 at. % Cr-13 at. % Pt-10 at. % B alloy, or a Co-12 at. % Cr-13 at. % Pt-12 at. % B alloy.

As results of fixing the addition concentrations of Pt and B to Co at 13 at. % and 12 at. % respectively and making comparison on the basis of the ratio between Co and Cr, in a case where Cr is 10 at. %, although the KV/kT can be increased, the thickness is inevitably decreased in order to set Brt4 to a desired value and, as a result, the crystallographic orientation is deteriorated. On the other hand, when the addition concentration of Cr increased as far as 14 at. %, logBER is degraded at the same KV/kT compared with the case of adding 12 at. % Cr. Further, it is found that when the addition concentration of Cr increases up to 14 at. %, the KV/kT is inevitably sacrificed in order to obtain the same logBER. From the results, it is found that satisfactory characteristics can be obtained in a case of using a Co-12 at. % Cr-13 at. % Pt-12 at. % B alloy for the fourth magnetic layer as a result of fixing the addition concentration of Pt and B to Co to 13 at. % and 12 at. %, respectively, and in view of the result of making the comparison on the basis of the rate between Co and Cr.

In a case of fixing the addition amount of Cr to 12 at. % and the addition amount of Pt to 13 at. % and making comparison on the basis of the rate between Co and B, substantially the same characteristic could be obtain in a case of controlling the concentration of B to 10 at. % and to 12 at. %. On the other hand, in a case where B increased to 14 at. %, the KV/kT decreased and the logBER was deteriorated. In view of the results, it is probable that the addition concentration of B is preferably about 12% or less.

Embodiment 3

FIG. 10 shows a constitutional cross-sectional view of a medium examined in this embodiment. A magnetic recording medium is formed in the same manner as in Embodiment 2 except that the following conditions are changed among the conditions for manufacturing Embodiment 2.

(1) The composition and thickness of the third magnetic layer are changed.

(2) The fourth magnetic layer is fixed to a Co-12 at. % Cr-13 at. % Pt-10 at. % B alloy.

The thickness of the second magnetic layer: Co-22 at. % Cr-14 at. % Pt-6 at. % B-2 at. % Ta included two types of 11.7 nm and 10.6 nm. As the composition for the third magnetic layer, Co-8 at. % Cr-13 at. % Pt-12 at. % B, Co-10 at. % Cr-13 at. % Pt-12 at. % B, Co-12 at. % Cr-13 at. % Pt-12 at. % B, Co-14 at. % Cr-13 at. % Pt-12 at. % B, Co-12 at. % Cr-13 at. % Pt-10 at. % B, and Co-12 at. % Cr-13 at. % Pt-14 at. % B were examined.

FIG. 11 shows the relationship between the magnetic characteristic and electromagnetic conversion characteristic of media. The specification of the head used for evaluation was the same as that in Embodiment 1 and the same head as that of Embodiment 2 was used for the evaluation of the electromagnetic conversion characteristic.

FIG. 12 shows the relationship between the LogBER and the KV/kT of Embodiment 3. More specifically, FIG. 12 shows that the third magnetic layer having the KV/kT of 80 or more and being able to decrease the logBER provided the best improvement in a case of utilizing a Co-12 at. % Cr-13 at. % Pt-12 at. % B alloy.

Co-8 at. % Cr-13 at. % Pt-12 at. % B, Co-10 at. % Cr-13 at. % Pt-12 at. % B, Co-12 at. % Cr-13 at. % Pt-12 at. % B, and Co-14 at. % Cr-13 at. % Pt-12 at. % B are compared with each other, as the composition for the third magnetic layer. As a result, in a case of fixing the addition concentration of Pt to 13 at. % and the addition concentration of B to 12 at. % and changing the Co—Cr ratio, although the KV/kT is large, the logBER is deteriorated at the Cr concentration of 8 at. %. In a case of the addition concentration of Cr of from 10 at. % to 12 at. %, substantially the same characteristic is obtained. When the addition concentration further increases up to 14 at. %, the logBER is deteriorated. In view of the relationship described above, in a case of fixing the addition concentration of Pt to 13 at. % and the addition concentration of B to 12 at. % and changing the Co—Cr ratio, it was found that a favorable characteristic is obtained at the addition concentration of Cr of from about 10 at. % to 12 at. %.

Further, Co-12 at. % Cr-13 at. % Pt-12 at. % B, Co-12 at. % Cr-13 at. % Pt-10 at. % B, and Co-12 at. % Cr-13 at. % Pt-14 at. % B are examined as the composition for the third magnetic layer. As a result, in a case of fixing the concentration of Cr to 12 at. % and fixing the addition concentration of Pt to 13 at. % and changing the Cr—B ratio, the KV/kT lowered monotonously and, at the same time, the logBER was deteriorated as the addition concentration of B increased from 10 at. % to 14 at. %. In view of the result, it is found that the addition concentration of B is preferably about 10 at. % in a case of fixing the addition concentration of Cr at 12 at. % and fixing the addition concentration of P at 13 at. %.

Embodiment 4

FIG. 13 shows a constitutional cross-sectional view of a medium examined in this embodiment. A magnetic recording medium is formed in the same manner as in Embodiment 2 except that the following conditions are changed among the conditions for manufacturing Example 2.

(1) The composition and thickness of the second magnetic layer are changed.

(2) The composition of the third magnetic layer is fixed to a Co-12 at. % Cr-13 at. % Pt-12 at. % B alloy and the thickness thereof is changed.

(3) The composition of the fourth magnetic layer is fixed to a Co-12 at. % Cr-13 at. % Pt-10 at. % B alloy and the thickness thereof is changed.

In order to compare the compositions of the second magnetic layer with or without Ta, the following alloy compositions were used for the comparison.
Co-20 at. % Cr-14 at. % Pt-6 at. % B-2 at. % Ta,
Co-22 at. % Cr-14 at. % Pt-4 at. % B-2 at.Ta,
Co-22 at. % Cr-14 at. % Pt-6 at. % B-2 at. % Ta,
Co-22 at. % Cr-14 at. % Pt-6 at. % B-0 at. % Ta,
Co-24 at. % Cr-14 at. % Pt-6 at. % B-0 at. % Ta.

FIG. 14 shows the relationship between the magnetic characteristic and the electromagnetic conversion characteristic of the media. The specification of the head used for evaluation was the same as that in Embodiment 1, and the same head as that of Embodiment 2 was used for the evaluation of the electromagnetic conversion characteristic.

FIG. 15 shows the relationship between the LogBER and the KV/kT of Embodiment 4. To be more specific, FIG. 15 shows that the third magnetic layer having the KV/kT of 80 or more and being able to decrease the logBER provides the greatest KV/kT and at the same time most improve the logBER in a case of using the Co-22 at. % Cr-14 at. % Pt-6 at. % B-2 at. % Ta alloy and Co-22 at. % Cr-14 at. % Pt-4 at. % B-2 at. % Ta alloy magnetic layers.

In a case of using a Co-22 at. % Cr-14 at. % Pt-6 at. % B alloy or a Co-24 at. % Cr-14 at. % Pt-6 at. % B alloy with no addition of Ta as the composition for the second magnetic layer, the logBER was degraded compared with the case of using the Ta-added alloy for the second magnetic layer. It was found that the logBER was improved by using the alloy with addition of at most 2 at. % Ta for the second magnetic layer. This is because the addition of Ta lowers the melting point, which enhances the moveability of atoms during thin film formation through sputtering, thereby improving crystallinity. When comparing the addition concentration of B, the difference between Co-22 at. % Cr-14 at. % Pt-4 at. % B-2 at.Ta and Co-22 at. % Cr-14 at. % Pt-6 at. % B-2 at.Ta is slight in the vicinity of KV/kT=80 in view of the relationship of KV/kT-logBER. Further, the comparison between Co-20 at. % Cr-14 at. % Pt-6 at. % B-2 at.Ta and Co-22 at. % Cr-14 at. % Pt-6 at. % B-2 at.Ta shows that a favorable logBER can be obtained in a case of using the Co-22 at. % Cr-14 at. % Pt-6 at. % B-2 at.Ta alloy with high Cr concentration for the second magnetic layer.

The results described above show that the medium having the KV/kT of 80 or more and the improved logBER can be formed by using the CoCrPtB alloy containing Ta as the second magnetic layer and forming the second magnetic layer to have a thickness larger than that of the third magnetic layer.

As has been described above, the magnetic recording medium of the invention can decrease the change in the effect of the thermal fluctuation and, at the same time, reduce the bit error rate. Accordingly, a magnetic recording medium with high reliability and a less aging change can be provided.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic recording medium comprising:
   a substrate;
   an underlayer film formed above the substrate;

a magnetic film comprising a first magnetic layer, a first non-magnetic intermediate layer, a second magnetic layer, a third magnetic layer formed directly on the second magnetic layer, a second non-magnetic intermediate layer and a fourth magnetic layer stacked above the underlayer film; and a protective layer formed above the magnetic film;

wherein:

a product (Brt2) of residual magnetic flux density and film thickness of the second magnetic layer is smaller than a product (Brt3) of residual magnetic flux density and film thickness of the third magnetic layer;

the second magnetic layer has a thickness larger than a thickness of the third magnetic layer;

the second magnetic layer is coupled anti-ferromagnetically with the first magnetic layer by way of the first non-magnetic intermediate layer;

the fourth magnetic layer is formed by way of the second non-magnetic intermediate layer above the third magnetic layer; and a product (Brt4) of residual magnetic flux density and film thickness of the fourth magnetic layer is from about 47% to 52% of a product (Brt_total) of residual magnetic flux density and film thickness of entire magnetic layers in a state of residual magnetization with an external magnetic field removed.

2. A magnetic recording medium according to claim 1, wherein each of the first, second, third, and fourth magnetic layers is a magnetic layer comprising cobalt (Co) as a main component, and each of the first and second non-magnetic intermediate layers is a non-magnetic intermediate layer comprising ruthenium (Ru) as a main component.

3. A magnetic recording medium according to claim 2, wherein the second magnetic layer comprises a Co—Cr—Pt—B—Ta alloy.

4. A magnetic recording medium according to claim 1, wherein magnetization directions of the first magnetic layer and the second magnetic layer are anti-parallel to each other, and magnetization directions of the third magnetic layer and the fourth magnetic layer are parallel to each other.

5. A magnetic recording medium according to claim 1, wherein the first non-magnetic layer comprises Ru and has a thickness of about 0.5 nm.

6. A magnetic recording medium according to claim 1, wherein the second non-magnetic layer comprises Ru and has a thickness of about 0.6 nm.

7. A magnetic recording medium according to claim 1, wherein the fourth magnetic layer comprises Ru and has an additional concentration of B at about 12% or less.

8. A magnetic recording medium according to claim 1, wherein the fourth magnetic layer has a composition of about Co-12 at. % Cr-13 at. % Pt-10 at. % B.

9. A magnetic recording medium according to claim 1, wherein the second magnetic layer has a composition of about Co-22 at. % Cr-14 at. % Pt-6 at. % B-2 at. % Ta.

* * * * *